Nov. 17, 1942.                    F. HELL                    2,301,948
                    AUTOMATIC BRAKE ADJUSTING MECHANISM
                          Filed Nov. 13, 1940
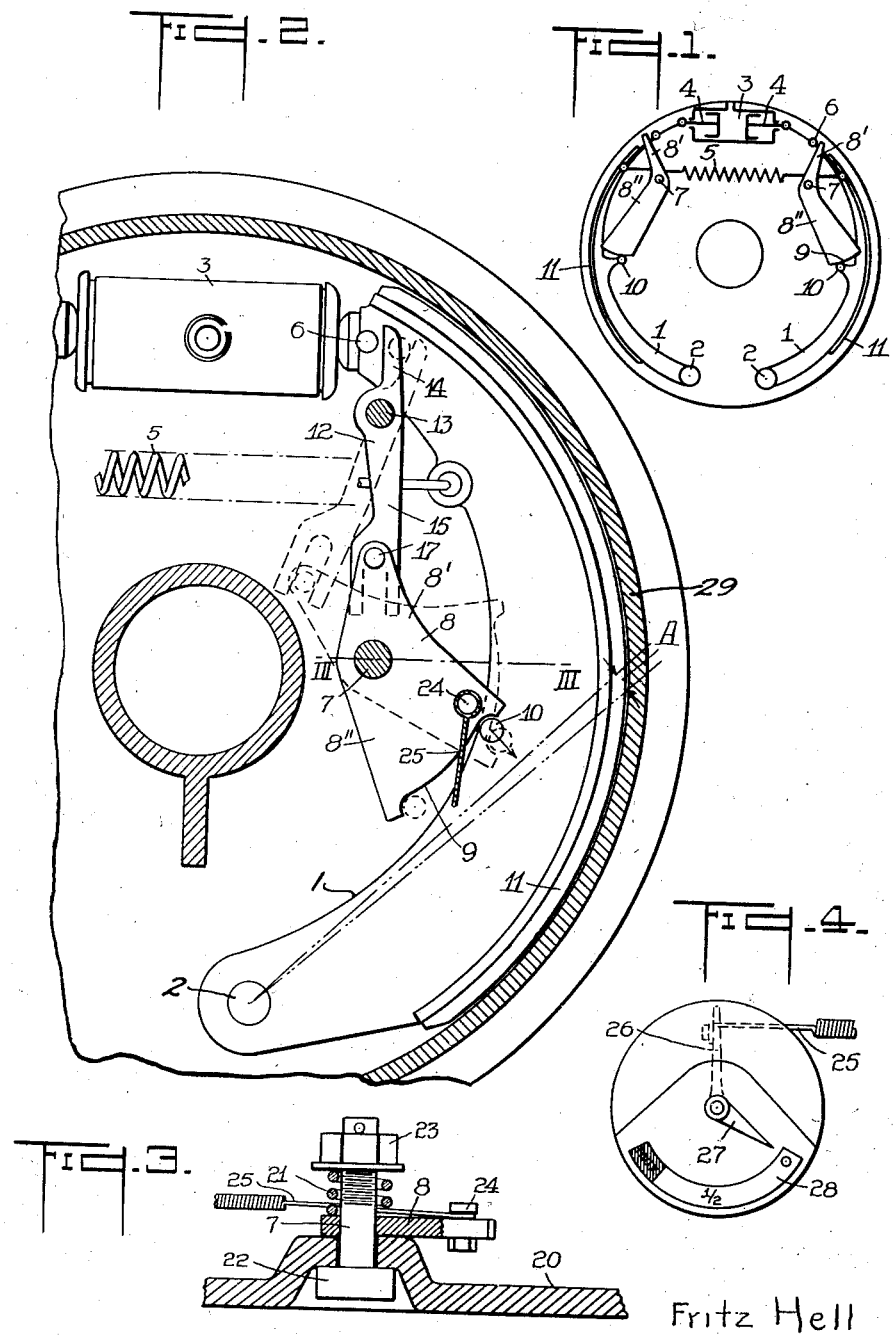
Fritz Hell
INVENTOR Patented Nov. 17, 1942

2,301,948

UNITED STATES PATENT OFFICE 2,301,948

AUTOMATIC BRAKE ADJUSTING MECHANISM

Fritz Hell, Vienna, Germany; vested in the Alien Property Custodian

Application November 13, 1940, Serial No. 365,492 In Germany September 30, 1939

7 Claims. (Cl. 188—79.5)

This invention relates to brake adjusters and is particularly directed to an automatic adjusting mechanism for hydraulic or pneumatic brakes.

One object of the invention is to provide a perfectly automatic braking mechanism in which the wear take-up is effected in infinitesimal increments and in a uniformly progressing way.

A further object of the invention is to construct an adjusting mechanism of this kind which can be operated with every assurance of safety and reliability and without the use of springs or similar easily braking parts. In the latter respect particular care has been taken to devise a construction in which no spring operated friction means are employed to prevent the backward movement of the adjusting elements, as it is well known that means of that type will block the backward movement only after the back-lash has been taken up, and for that reason make accurate adjustment impossible.

Still another object of the invention is the provision of an adjusting mechanism which can be assembled from only a small number of elements, and being of simple form will be susceptible of incorporation at low cost and without material difficulty in any conventional brake mechanism.

Other objects and advantages of the invention will become apparent as the description of the same proceeds, and the invention will be best understood from the consideration of the following detailed description taken in connection with the accompanying drawing forming a part of the specification and in which similar reference numerals indicate like parts in the different figures, with the understanding, however, that the invention is not confined to any strict conformity with the showing of the drawing but may be changed or modified so long as such changes or modifications mark no material departure from the salient features of the invention as expressed in the appending claims.

In the drawing:

Fig. 1 is a diagrammatical illustration of a complete adjusting mechanism;

Fig. 2 is a sectional view of a preferred embodiment of the invention, showing the right side of the adjusting mechanism after removal of the back plate;

Fig. 3 is a detail sectional view of the back plate and the adjusting eccentric on line III—III of Fig. 2;

Fig. 4 is a detail view of a simple mechanism indicating the degree of wear of the brake lining.

Referring now to the drawing in detail, the reference numeral 1 (in Fig. 1) denotes the brake shoes provided with the brake lining 11 and pivoted at 2. 3 is the brake cylinder which houses the pistons or pressure members 4, by means of which the brake shoes are actuated and forced into engagement with the brake drum 29 (shown in Fig. 2), while 5 is a retracting spring adapted to return the brake shoes to their original position at the end of each actuation. Pivotally mounted on the back plate as indicated at 7 are the adjusting eccentrics 8, having the shape of two-armed levers, and of which the shorter arms 8' cooperate with the drivers 6 mounted on the brake shoes. The free ends of the longer arms 8'' of the levers are formed with a rising edge 9 of spiral-like or similar formation for cooperation with the stops 10 likewise mounted on the brake shoes.

The device functions as follows: When the brake lining 11 is new, that is to say, prior to any wear of the friction faces, the clearance distance corresponds to the distance between the driver 6 and the opposite edge of the lever arm 8', so that no adjusting of the lever occurs when the brake is actuated. But, when the brake shoe is forced against the drum after there has been some wear on the brake lining the length of the path of the driver 6 will be increased for an amount corresponding to the amount of wear of the friction faces, for which reason the free end of the lever arm 8' will likewise be displaced for the same additional amount, while the eccentric 8 will simultaneously be rotated through an angle corresponding to the amount of displacement of the arm 8'. When the eccentric 8 is being rotated its second arm 8'', provided at its free end with the rising edge 9 of spiral-like formation, will be rotated as well, reducing in this way the possible distance of retraction of the brake shoe for an amount corresponding to the amount of wear of the brake lining to the normal clearance distance. It is obvious, therefore, that the clearance distance as well as the braking distance will remain unchanged regardless of the amount of wear which may have taken place in the brake lining. Of course the retracting spring 5 will try to return the adjusting eccentric 8 to its original position. This, however, will be prevented by the self-locking construction of the eccentric 8 which makes backward rotation impossible. Such self-locking effect can be obtained in various ways, particularly however through adequate selection of the ratio of the two lever arms 8' and 8''. If the ratio of the two lever arms is large enough the curve 9 will become so flat that self-locking will result, and such self-locking action can be further augmented by friction created with the aid of springs or otherwise between the lever and the underlying back plate.

In the modified form of construction illustrated in Fig. 2 the adjusting eccentric 8 is not actuated directly by the driver 6 but through the medium of the forked end lever 12, which latter is pivotally mounted on the back plate, as indicated at 13. The shorter arm 14 of the lever 12 cooperates with the driver 6, while the longer arm 15 of that lever is formed with a slot in which is disposed a pin 17 carried by the shorter arm 8' of the eccentric 8. It is apparent that through an arrangement like this a powerful leverage may be created between the driver 6 and the lever arm 8" provided with the rising edge 9. It is further obvious that instead of the lever system suitable gear means may be employed. In the form of construction suggested in Fig. 2 the setting movement is doubled already in the area between the driver 6 and the pin 17, whereupon the ratio of the lever arms 8' and 8" further increases the setting movement to about four times the movement of the driver 6. The latter fact becomes clearly discernible when the starting position (shown by full lines) of the driver 6 and the lever arm 14, on one hand, and the stop 10 and rising edge 9, on the other hand, is compared with the position of greatest wear A of the brake lining of the same elements (shown in dot-and-dash line position). In a construction like this the inclination of the edge 9 is a very slight one. Attention is further invited to the fact that the stop 10 has been arranged on the brake shoe at a place whose distance from the pivot 2 approximately corresponds to the distance of the pivot 7 from the pivot 2, so that the backward movement of the stop 10 caused by the retracting force of the spring 5 is always effective in radial direction toward the pivot 7. If the lever system is devised like this it will be impossible for the stop 10, when the latter is moving backward, to return the lever 8 to its former position either by sliding along the edge 9 or in any other way, so that self-locking is already guaranteed by this construction. However, if further assurance in this respect is considered necessary the friction between the eccentric 8 and the back plate 20 can be increased as indicated in Fig. 3. In this latter form of construction a screw 7 has been substituted for the pivot 7. The screw 7 is anchored with its head 22 in a recess of the back plate 20 and provided at its opposite end with a nut 23, while a spring 21 mounted on the shaft of the screw bears against the nut 23 and forces the eccentric 8 against the back plate 20.

It is further possible to equip the adjusting eccentric 8 with a simple device by which the degree of wear of the brake lining will be accurately indicated, so that it can be read off and controled at any moment of the operation of the mechanism. For this purpose it is merely necessary to fasten to a pin 24 of the eccentric 8 (Fig. 3) one end of a "Bowden"-draw-member 25 whose other end is connected to an arm 26 of a recording mechanism provided with a pointer 27 and an arcuate scale member 28 indicating the degree of wear of the brake lining (see Fig. 4). With the aid of a simple apparatus of this type even the slightest change in the position of the lever arm 8" will immediately be indicated by the pointer, which according to the degree of wear of the brake lining will gradually move from 0 to the end of the scale, demonstrating in this very impressive way the necessity of an urgent renewal of the brake lining.

A brake adjusting mechanism as described in the present invention functions in a perfectly automatic and uniformly progressing way, the wear take-up being accomplished in infinitesimal increments. Moreover, a device like this can be operated with every assurance of safety and reliability, as its self-locking quality is the direct result of the particular construction of the adjusting eccentric, and not dependent upon friction caused by easily braking springs.

What I claim is:

1. A wear compensating arrangement for breaks having a pivotally supported brake shoe operable against the action of resilient retracting means, said arrangement comprising a pivotally mounted lever having two arms of different length, a cam element arranged for actuation by the longer arm of said lever and having a rising edge, a first stop on said brake shoe for cooperation with the shorter arm of said lever, and a second stop on said brake shoe for cooperation with said rising edge of said cam element to effect a wear compensating adjustment of the brake shoe when said lever is rotated upon engagement of its shorter arm by said first stop.

2. An arrangement, as claimed in claim 1, in which the inclination of said rising edge of said cam element is so slight that pressure exercised by said second stop against said rising edge owing to the pulling force exerted upon said brake shoe by said retracting means is unable to effect a backward rotation of said lever and cam.

3. An arrangement, as claimed in claim 1, in which said second stop is arranged about halfway between the pivoted end and the free end of said brake shoe.

4. An arrangement as claimed in claim 1, in which said lever and cam element are so dimensioned and arranged that any linear movement of said first stop which serves to actuate said lever results in a greater linear movement of said rising edge on said cam element.

5. An arrangement, as claimed in claim 1, in which said cam element is integral with the longer arm of said lever.

6. An arrangement, as claimed in claim 1, in which the distance between said second stop and the pivot point of the brake shoe is substantially equal to the distance between the pivot point of said cam element and the pivot point of said brake shoe.

7. An arrangement, as claimed in claim 1, in which said cam element is formed as a separate lever to increase the ratio of leverage between said first stop and said rising edge.

FRITZ HELL.